(12) United States Patent
Lim et al.

(10) Patent No.: US 10,484,363 B2
(45) Date of Patent: Nov. 19, 2019

(54) METHOD AND APPARATUS FOR AUTHENTICATING A DEVICE USING BLUETOOTH TECHNOLOGY

(71) Applicant: LG ELECTRONICS INC., Seoul (KR)

(72) Inventors: Jinkwon Lim, Seoul (KR); Donghyun Kang, Seoul (KR); Jingu Choi, Seoul (KR); Minsoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 15/602,830

(22) Filed: May 23, 2017

(65) Prior Publication Data

US 2017/0339128 A1 Nov. 23, 2017

Related U.S. Application Data

(60) Provisional application No. 62/339,972, filed on May 23, 2016.

(51) Int. Cl.
*H04L 29/06* (2006.01)
*H04B 7/26* (2006.01)
(Continued)

(52) U.S. Cl.
CPC ............ *H04L 63/083* (2013.01); *H04B 7/26* (2013.01); *H04L 9/0637* (2013.01); *H04L 9/0819* (2013.01); *H04L 9/14* (2013.01); *H04L 9/30* (2013.01); *H04L 9/3242* (2013.01); *H04L 63/0492* (2013.01); *H04L 63/061* (2013.01);
(Continued)

(58) Field of Classification Search
CPC . H04L 63/083; H04L 63/061; H04L 63/0861; H04L 63/12; H04L 63/18; H04L 63/123; H04L 9/0819; H04L 9/14; H04L 9/30; H04L 9/3242; G06F 21/32; G06F 21/43; H04W 4/80; H04W 12/06
USPC ......... 713/168, 176, 186; 726/2–7; 380/270, 380/46
See application file for complete search history.

(56) References Cited

U.S. PATENT DOCUMENTS 7,861,092 B2 * 12/2010 Wei .................. G06F 21/32
380/255
8,769,643 B1 * 7/2014 Ben Ayed ............. H04W 12/06
726/5

(Continued)

*Primary Examiner* — Hosuk Song
(74) *Attorney, Agent, or Firm* — Birch, Stewart, Kolasch & Birch, LLP

(57) ABSTRACT

Disclosed is a method and an apparatus for a first device to perform authentication by using Bluetooth LE (Low Energy). The present invention provides a method and an apparatus comprising exchanging capability information with a second device; generating a random code for first authentication through a user authentication service based on the capability information; transmitting a write request message including the generated random code to the second device; receiving a write response message in response to the write request message from the second device; receiving an authentication indication message from the second device, wherein the authentication indication message includes state information indicating success or failure of the first authentication based on the random code; and transmitting an authentication complete message in response to the authentication indication message.

18 Claims, 14 Drawing Sheets

(51) Int. Cl.
*H04L 9/14* (2006.01)
*H04L 9/30* (2006.01)
*H04L 9/08* (2006.01)
*H04L 9/32* (2006.01)
*H04L 9/06* (2006.01)
*H04W 12/06* (2009.01)
*H04W 4/80* (2018.01)

(52) U.S. Cl.
CPC .......... *H04L 63/0861* (2013.01); *H04L 63/18* (2013.01); *H04W 4/80* (2018.02); *H04W 12/06* (2013.01); *H04L 2209/805* (2013.01)

(56) References Cited

U.S. PATENT DOCUMENTS

| | | | | |
|---|---|---|---|---|
| 9,462,469 B2* | 10/2016 | Hillyard | ................ | G06F 8/654 |
| 9,980,137 B2* | 5/2018 | South | ................ | H04W 4/90 |
| 2016/0234683 A1* | 8/2016 | Bone | ................ | H04W 4/70 |

* cited by examiner

[Fig.1]
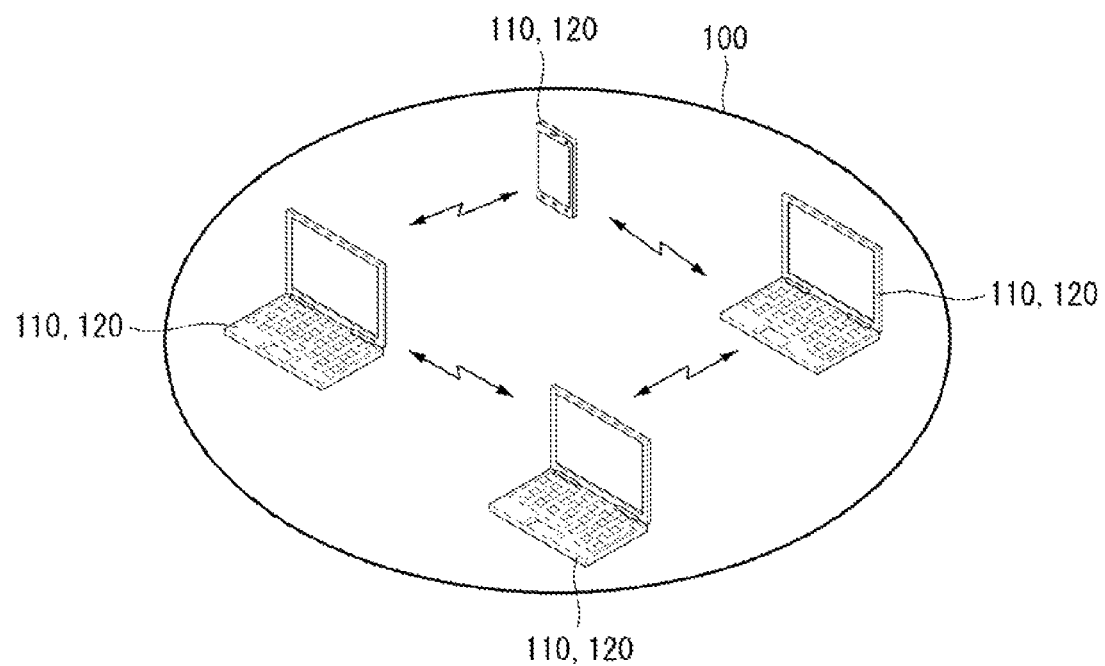

[Fig.2]
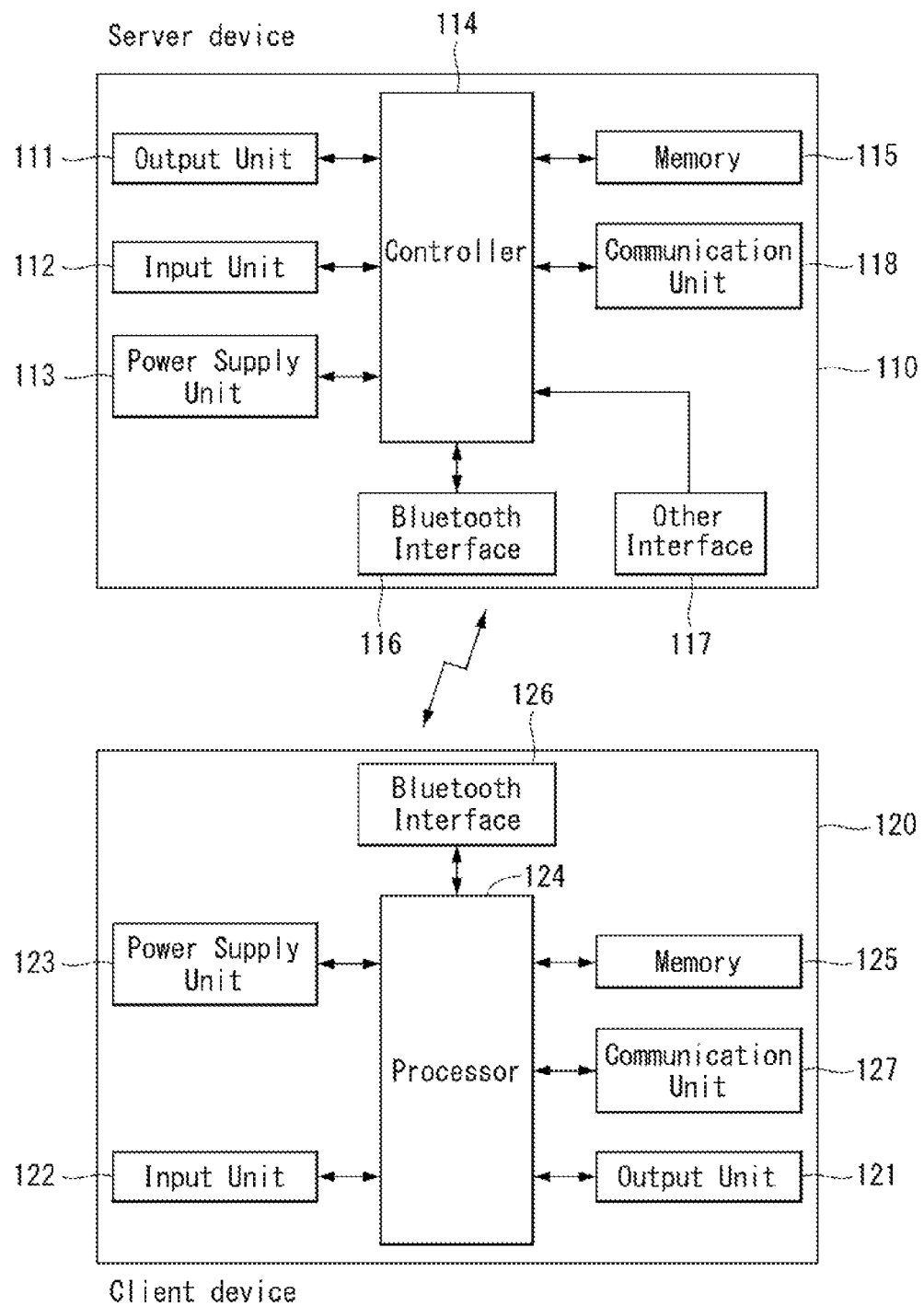

[Fig.3]
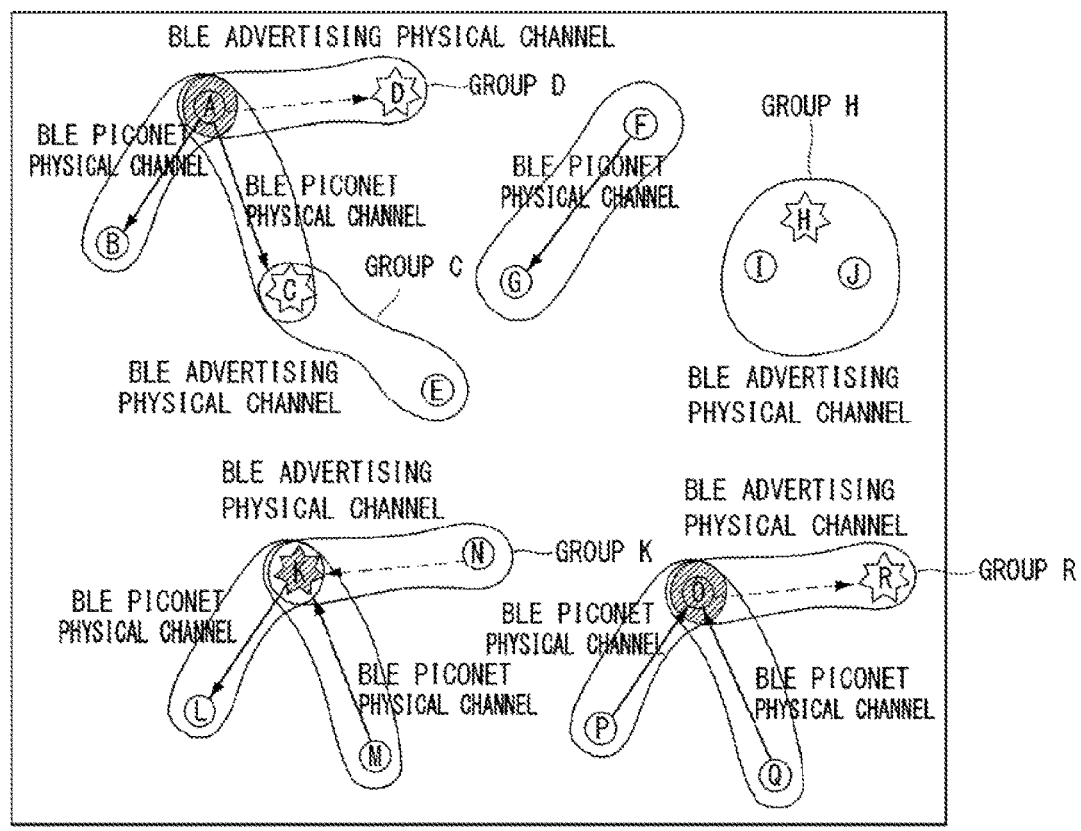

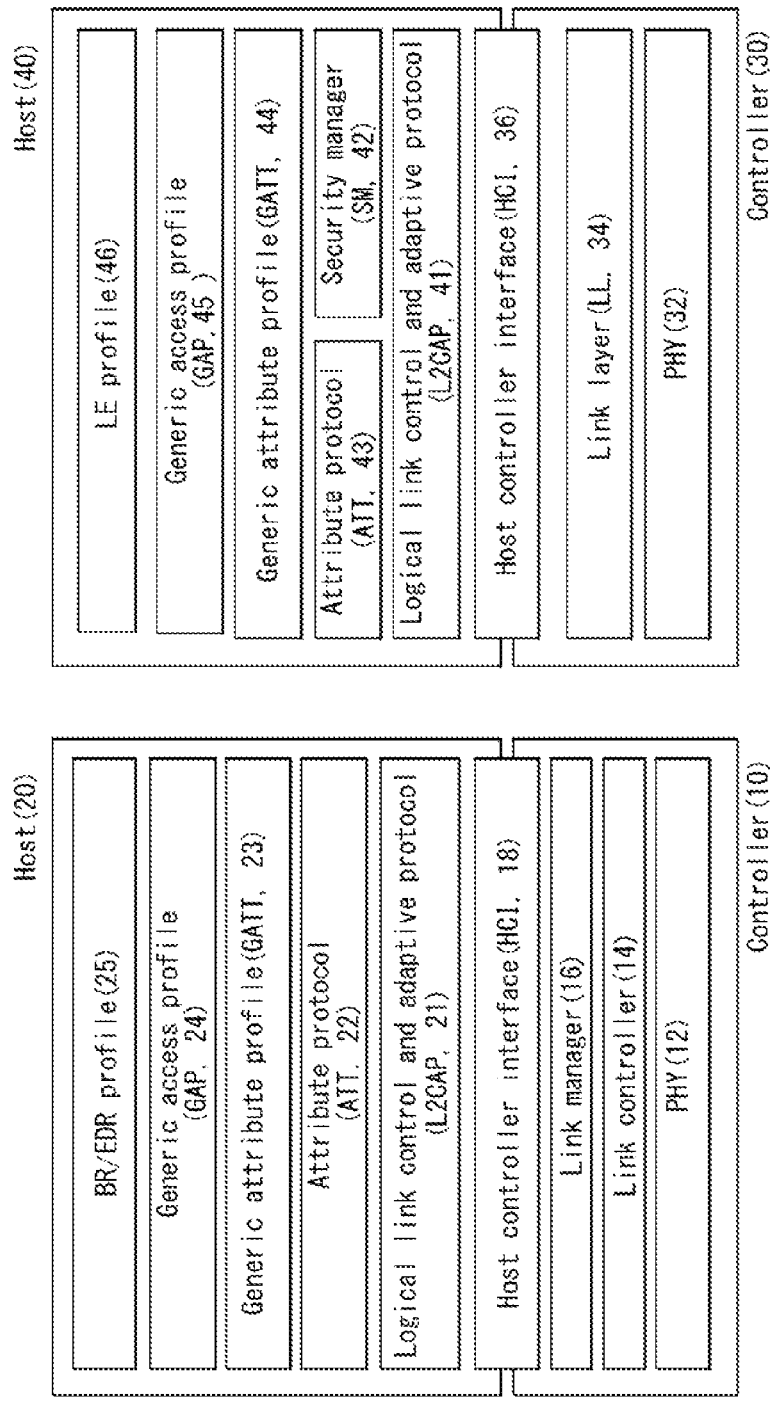
[Fig. 4]

[Fig.5]
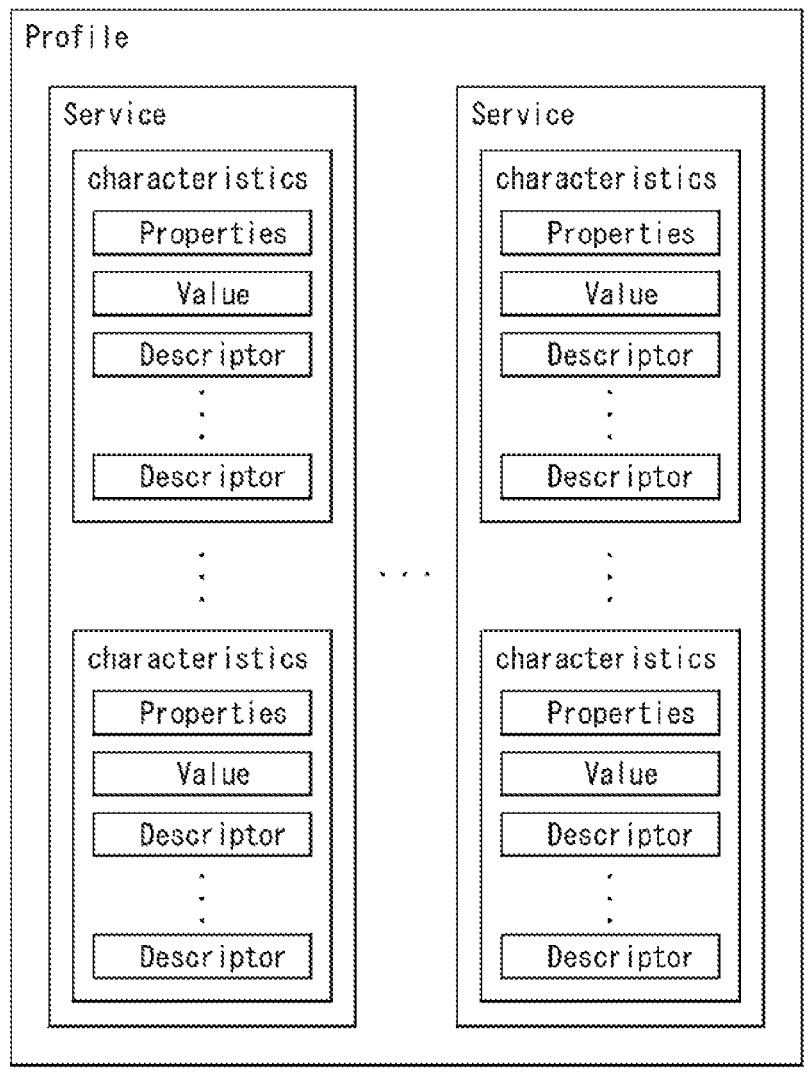

[Fig.6]
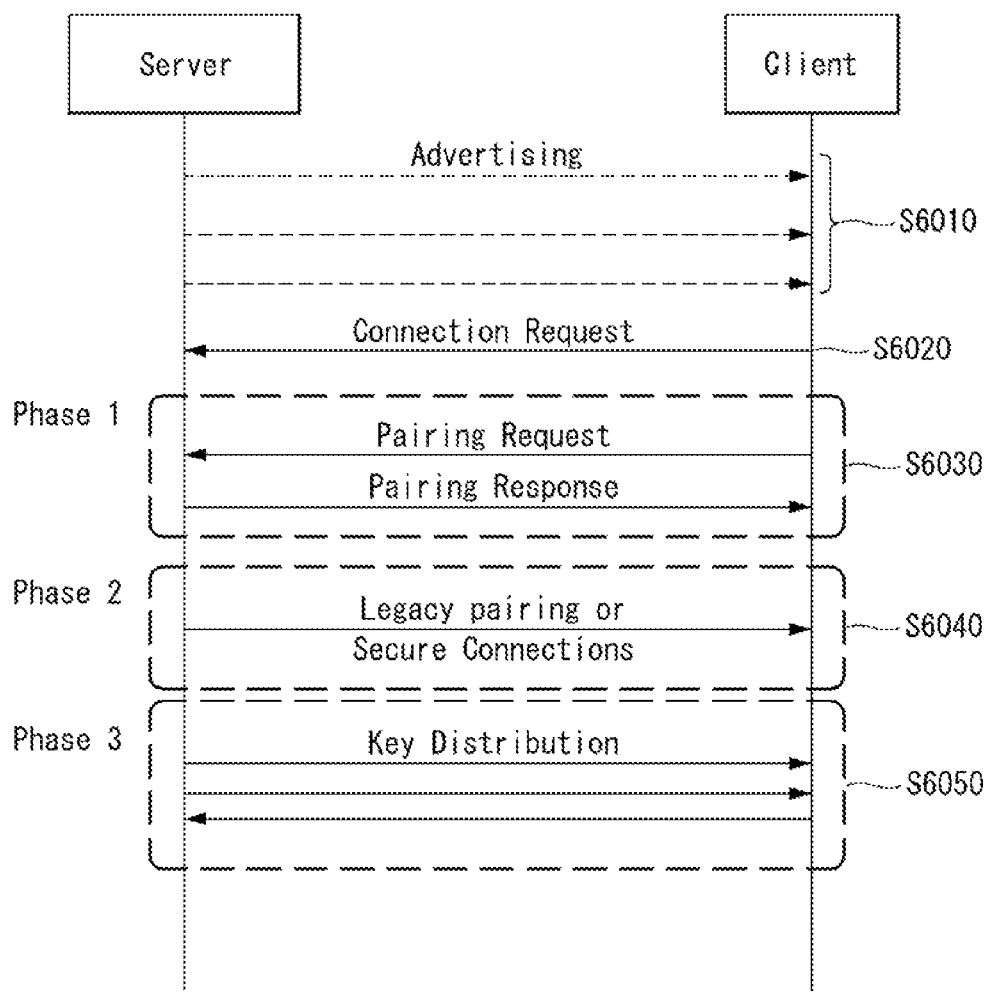

[Fig.7]
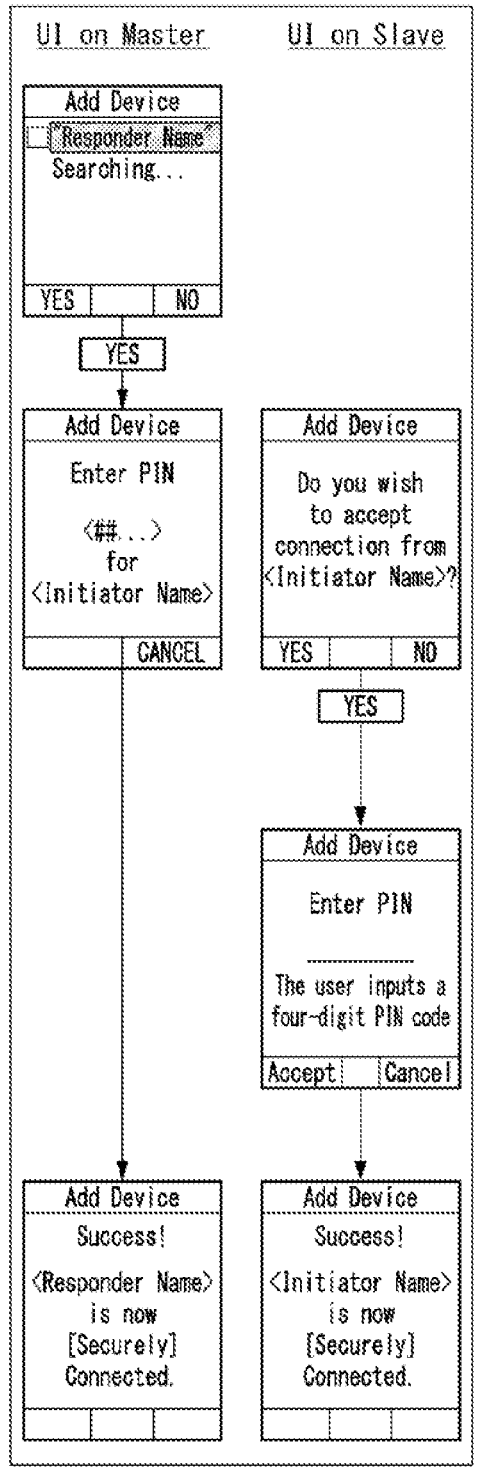
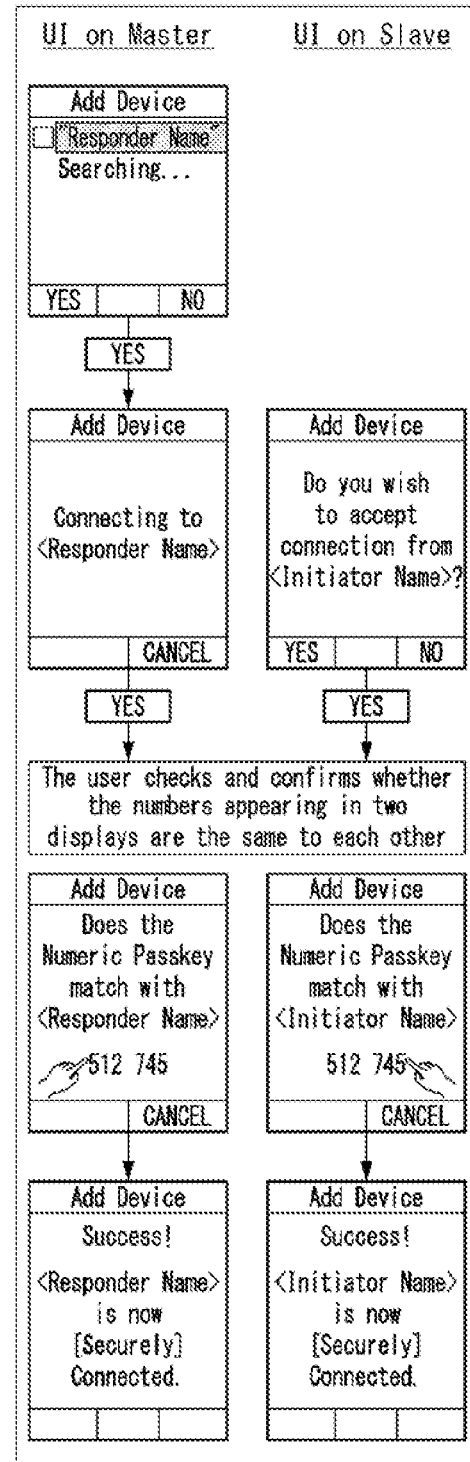
(a) Legacy Pairing    (b) Numeric Comparison

[Fig.8]
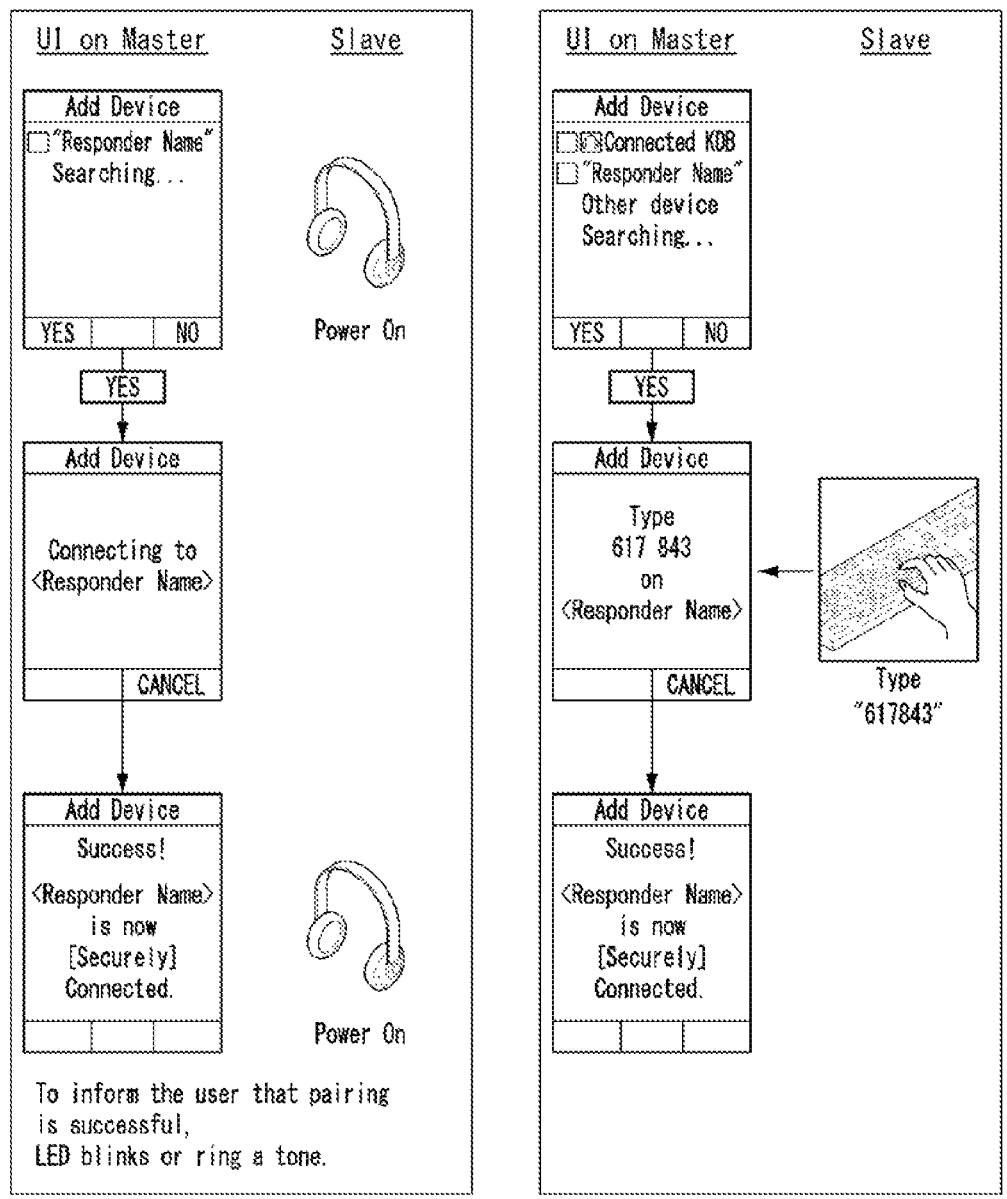

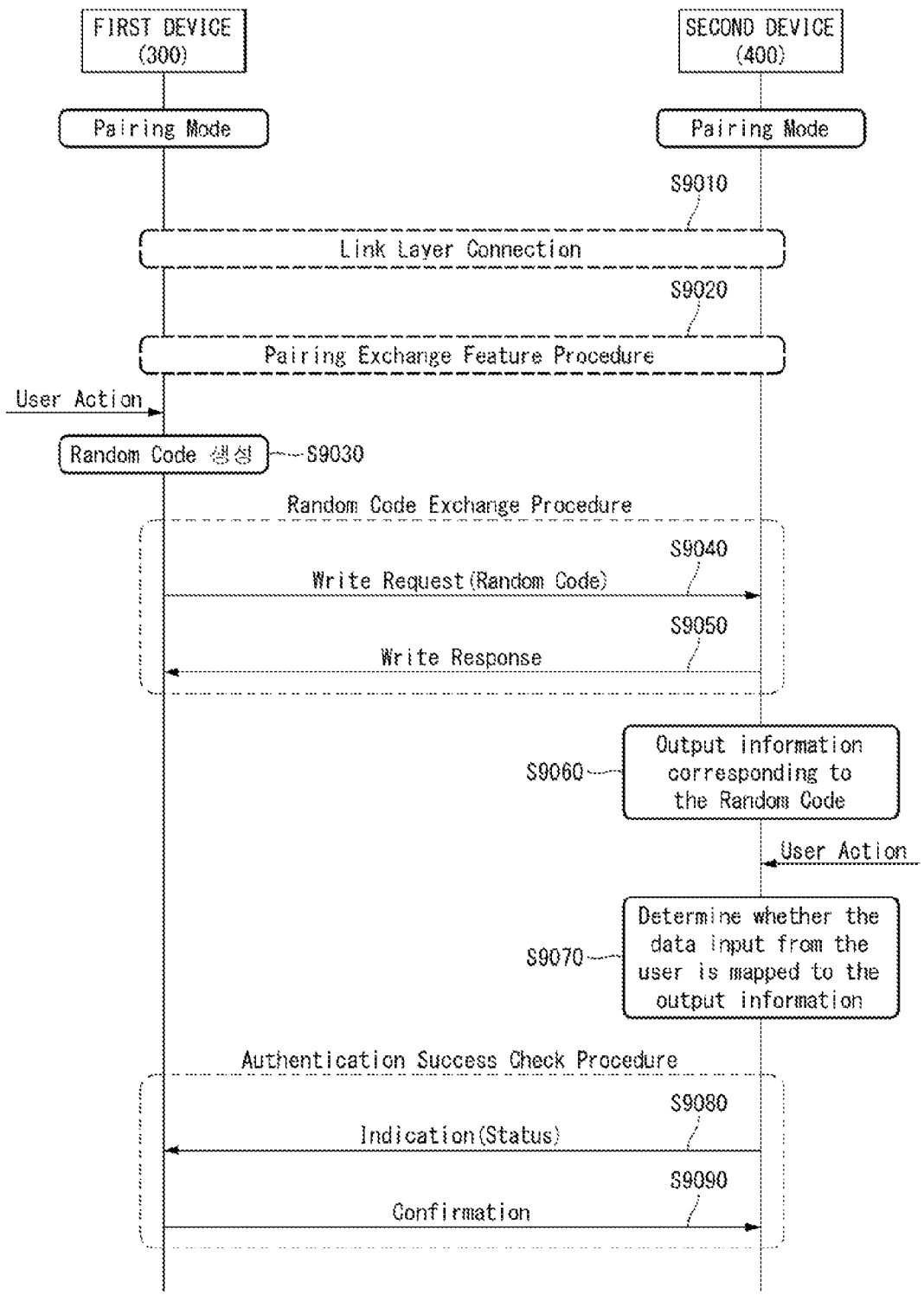

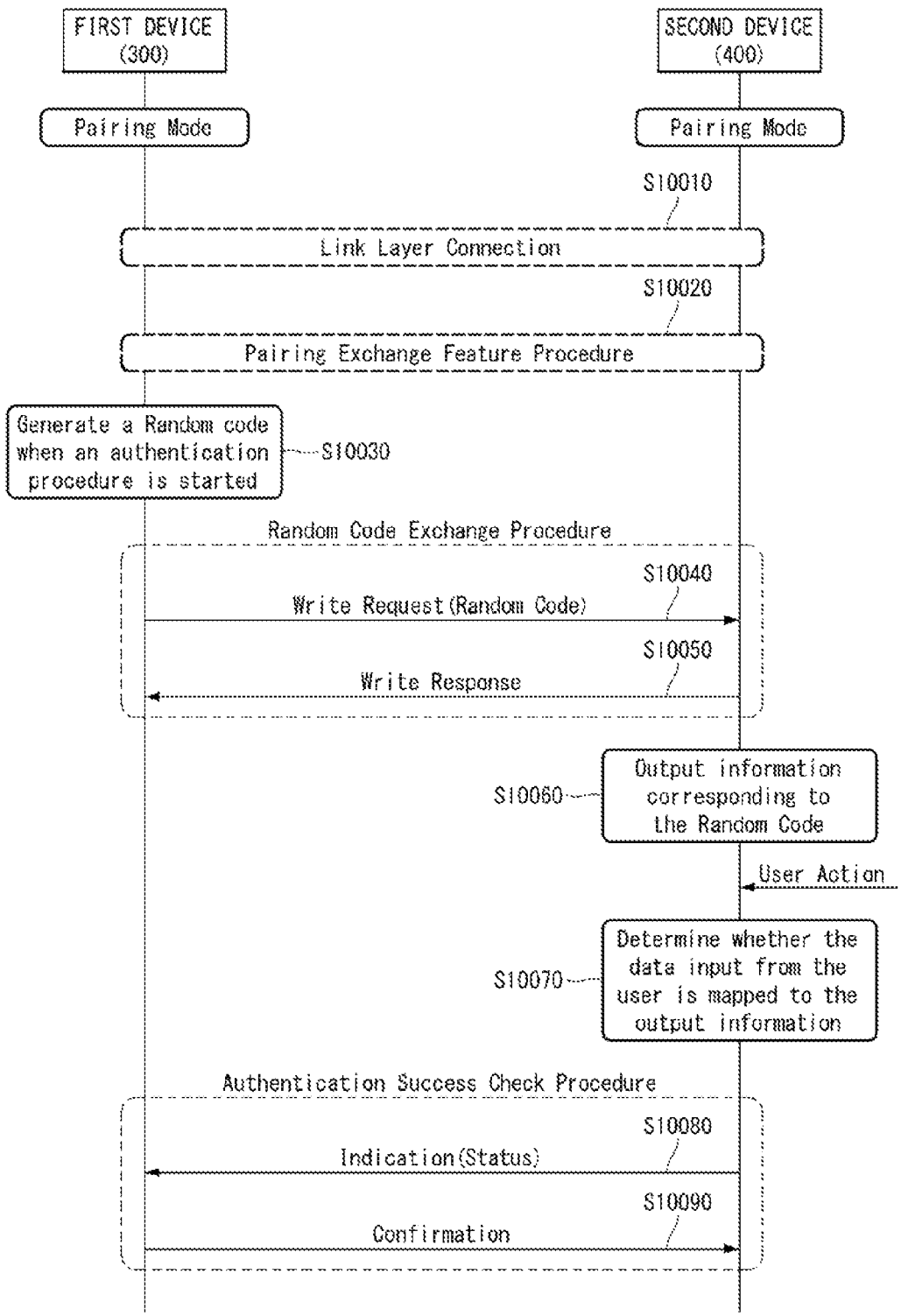

[Fig.11]
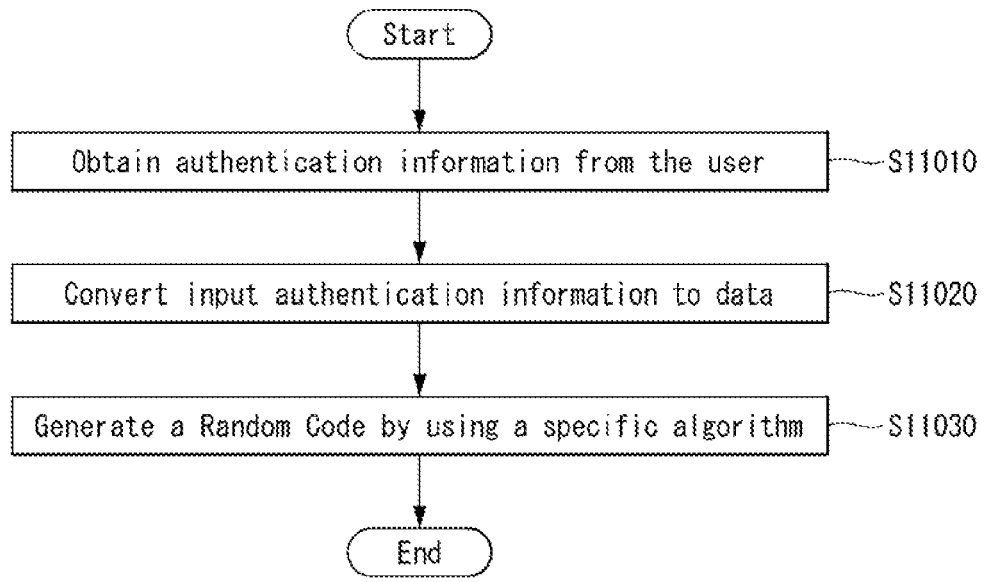

[Fig.12]
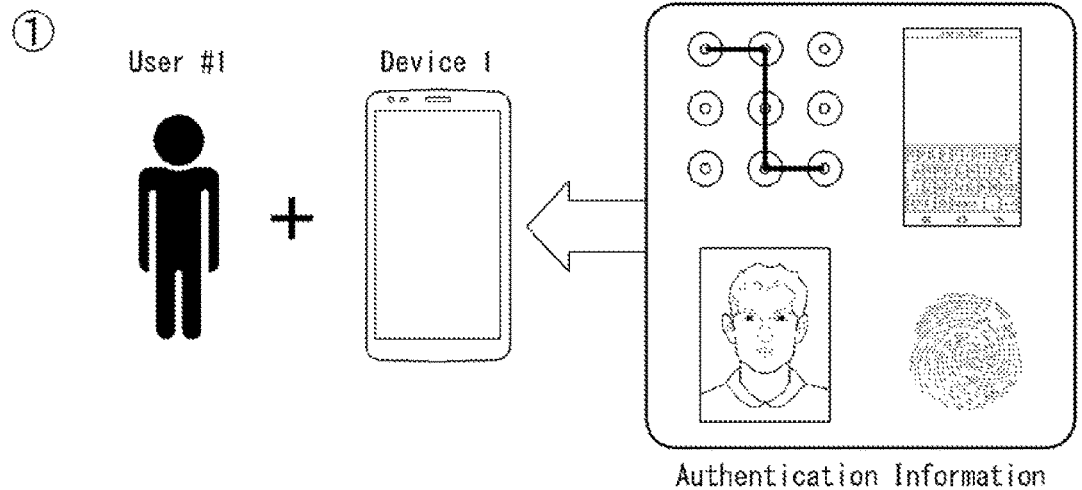
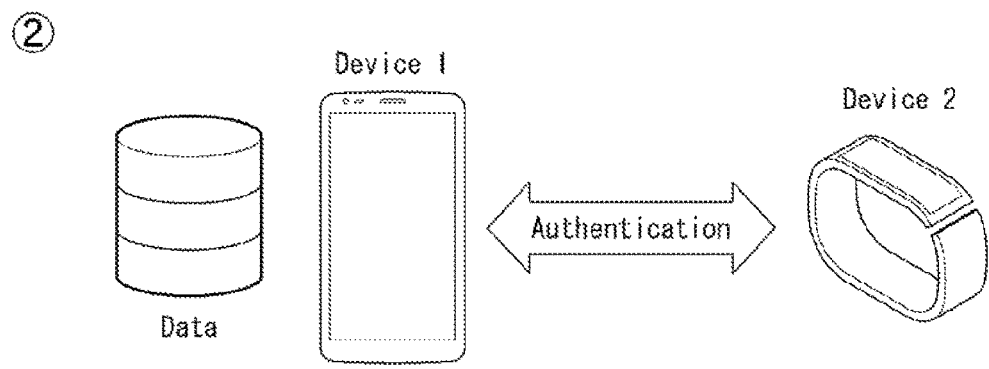

[Fig.13]
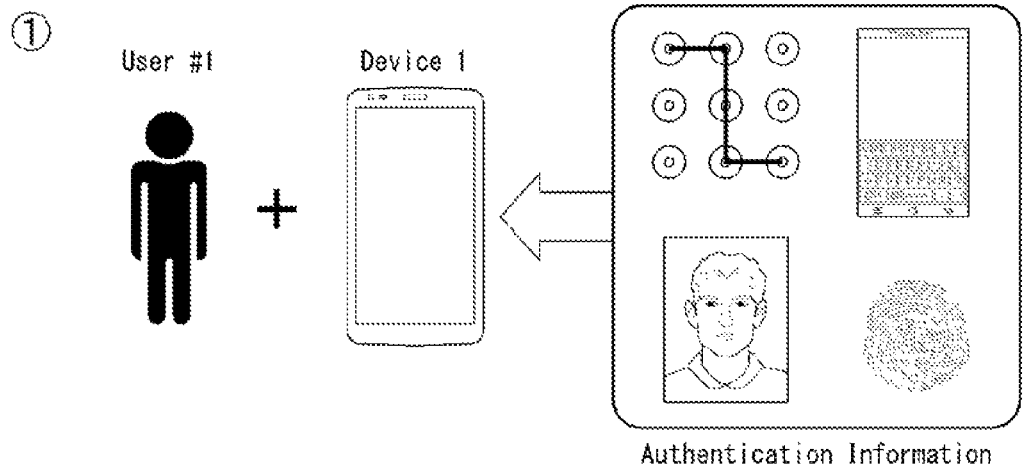
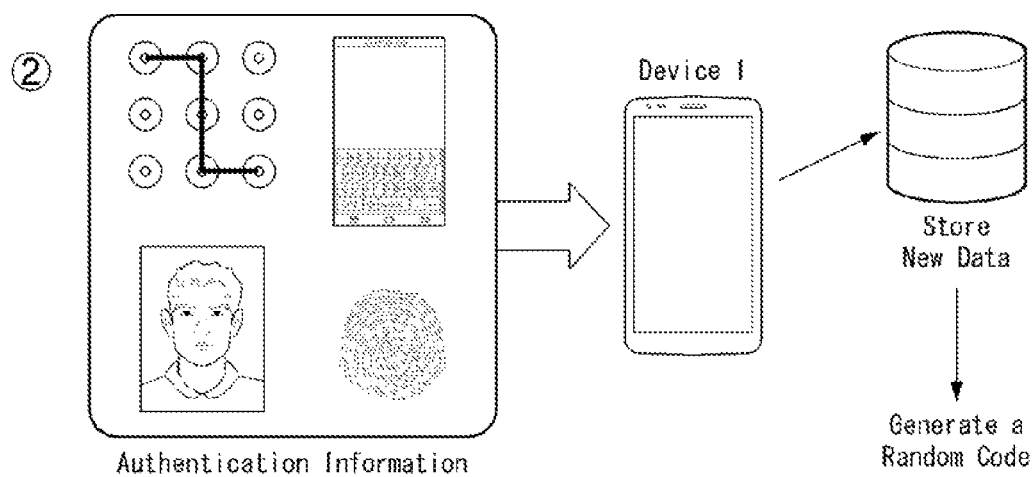
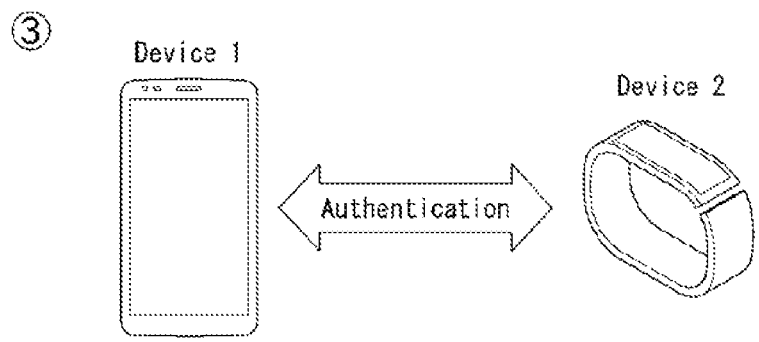

[Fig.14]
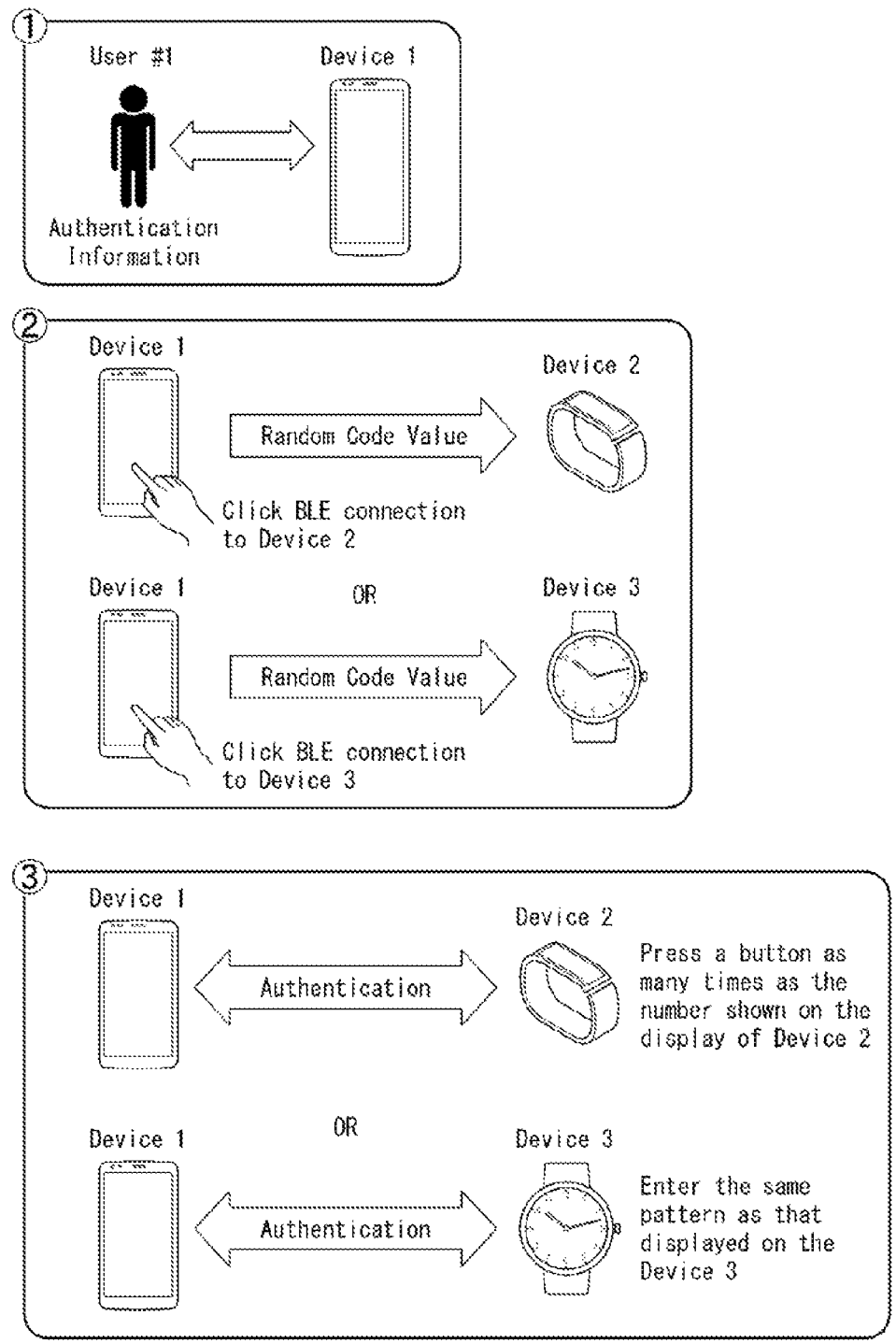

METHOD AND APPARATUS FOR AUTHENTICATING A DEVICE USING BLUETOOTH TECHNOLOGY

CROSS-REFERENCE TO RELATED APPLICATIONS

This application priority to Provisional Application No. 62/339,972 filed on 23 May 2016 in US the entire contents of which are hereby incorporated by reference in its entirety.

BACKGROUND OF THE INVENTION

Field of the Invention

The present invention relates to Bluetooth, a short-range communication technology in a wireless communication system and more specifically, a method and an apparatus for authenticating a device by using Bluetooth Low Energy (LE) technology.

Discussion of the Related Art

Bluetooth is a short-range wireless technology standard that may wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

In this case, the user may discover a Bluetooth device according to a Bluetooth communication method intended to be used with the Bluetooth device using the Bluetooth device, and then perform a connection with the Bluetooth device.

The Bluetooth communication method may be divided into as a BR/EDR method and an LE method. The BR/EDR method may be called a Bluetooth Classic method. The Bluetooth Classic method includes a Bluetooth technology led from Bluetooth 1.0 and a Bluetooth technology using an enhanced data rate (EDR) supported by Bluetooth 2.0 or a subsequent version.

A BLE technology applied, starting from Bluetooth 4.0, may stably provide information of hundreds of kilobytes (KB) at low power consumption. Such a BLE technology allows devices to exchange information with each other using an attribute protocol. The BLE method may reduce energy consumption by reducing the overhead of a header and simplifying the operation.

Some of the Bluetooth devices do not have a display or a user interface. The complexity of a connection, management, control, and a disconnection between various Bluetooth devices and Bluetooth devices using similar technologies is increasing.

Bluetooth supports a high speed at a relatively low cost with relatively low power consumption. However, Bluetooth is appropriately used within a limited space because it has a maximum transmission distance of 100 m.

SUMMARY OF THE INVENTION

An object of the present invention is to provide a method and an apparatus for authenticating a device by using the Bluetooth technology.

Also, an object of the present invention is to provide a method and an apparatus for authenticating a device by using user information to establish a Bluetooth connection.

Also, an object of the present invention is to provide a method and an apparatus for authenticating a device by using information input by the user and the corresponding operation to establish a Bluetooth connection.

Also, an object of the present invention is to provide a method and an apparatus for authenticating a device by using different schemes according to input/output functions of the device.

Technical objects of the present invention are not limited to those described above, but other technical objects not mentioned in this document will be clearly understood from the descriptions given below by those skilled in the art to which the present invention belongs.

To solve the technical problem described above, the present invention provides a method for a first device to control a second device by using the Bluetooth technology.

More specifically, a method for a first device to control a second device by using the Bluetooth technology according to one embodiment of the present invention comprises exchanging capability information with the second device; generating a random code for first authentication through a user authentication service based on the capability information; transmitting a write request message including the generated random code to the second device; receiving a write response message in response to the write request message from the second device; receiving an authentication indication message from the second device, wherein the authentication indication message includes state information indicating success or failure of the first authentication based on the random code; and transmitting an authentication complete message in response to the authentication indication message.

Also, the exchanging according to the present invention comprises transmitting a request message requesting capability information of the second device, wherein the request message includes first input/output capability information of the first device; and receiving a response message including second input/output capability information of the second device in response to the request message.

Also, the method according to the present invention further comprises determining a specific method for establishing a secure connection based on the second input/output capability information; and performing an authentication procedure for second authentication by using the specific method.

Also, the specific method according to the present invention is one of OOB (Out-Of-Band), Passkey Entry, Numeric Comparison, or Just Works.

Also, the method according to the present invention further comprises obtaining authentication information for the first authentication from the user.

Also, the authentication information according to the present invention is one of a password, pattern, or biometric information of the user.

Also, the method according to the present invention further comprises transmitting a first public key to the second device; and receiving a second public key from the second device.

Also, the random code according to the present invention is generated by a specific algorithm based on the authentication information and the second public key.

Also, the specific algorithm according to the present invention is AES (Advanced Encryption Standard)-CMAC (Cipher-based Message Authentication Code) algorithm.

Also, a method for a first device to control a second device by using the Bluetooth technology according to one embodiment of the present invention comprises exchanging capability information with a second device; receiving from the second device a write request message including a random code for first authentication through a user authentication service, wherein the random code is generated based on the capability information; transmitting a write response message in response to the write request message to the first device; performing a specific operation corresponding to the random code; transmitting an authentication indication message including state information to the second device, wherein the state information indicates success or failure of the first authentication according to whether specific data obtained from the user is mapped to the specific operation; and receiving an authentication complete message in response to the authentication indication message.

Also, according to the present invention, the state information indicates success of the first authentication in case the specific data is mapped to the specific operation, while the state information indicates failure of the second authentication in case the specific data is not mapped to the specific operation.

Also, a device according to the present invention comprises a communication unit for communicating to and from the outside in a wired or wireless manner; and a processor functionally connected to the communication unit, wherein the processor is configured to exchange capability information with a second device; to generate a random code for first authentication through a user authentication service based on the capability information; to transmit a write request message including the generated random code to the second device; to receive a write response message in response to the write request message from the second device; to receive an authentication indication message from the second device, wherein the authentication indication message includes state information indicating success or failure of the first authentication based on the random code; and to transmit an authentication complete message in response to the authentication indication message.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 shows an example of a wireless communication system using a BLE technology according to an embodiment of the present invention.

FIG. 2 shows an example of an internal block diagram of a server device and a client device capable of implementing methods according to embodiments of the present invention.

FIG. 3 shows an example of a BLE network topology.

FIG. 4 illustrates one example of Bluetooth communication architecture to which methods according to the present invention may be applied.

FIG. 5 shows an example of the GATT Profile structure of the BLE specification.

FIG. 6 shows an example of a method for the connection procedure of the BLE specification.

FIGS. 7 and 8 illustrate one example of an authentication method to which methods according to the present invention may be applied.

FIG. 9 is a flow diagram illustrating one example of an authentication procedure for a device according to the present invention.

FIG. 10 is a flow diagram illustrating another example of an authentication procedure for a device according to the present invention.

FIG. 11 is a flow diagram illustrating one example of a method for generating a code for authenticating a device according to the present invention.

FIG. 12 illustrates one example of a method for authenticating a device by generating authentication information through user information according to the present invention.

FIG. 13 illustrates another example of a method for authenticating a device by generating authentication information through user information according to the present invention.

FIG. 14 illustrates a yet another example of a method for authenticating a device by generating authentication information through user information according to the present invention.

DETAILED DESCRIPTION OF THE EMBODIMENTS

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic diagram illustrating an example of a wireless communication system using Bluetooth low energy technology proposed in the specification.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The servicer device 120 may be termed alternatively as a data service device, slave device, slave, server, conductor, host device, gateway, sensing device, monitoring device, first device, or second device.

The client device 110 may be termed alternatively as a master device, master, client, member, sensor device, sink device, collector, third device, or fourth device.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

FIG. 2 is a block diagram of a device capable of realizing methods proposed in the specification.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules which receive external power and internal power and provide power necessary for operation of components under the control of the processor.

As described above, BLE technology has a small duty cycle and can remarkably reduce power consumption through a low data rate.

The input units 112 and 122 refer to modules which provide user input through a screen button, for example, to the controller such that the user can control device operation.

FIG. 3 shows an example of a BLE network topology.

Referring to FIG. 3, a device A corresponds to a piconet (piconet A, the shaded area) master having a device B and a device C as slaves.

In this case, a piconet refers to a set of devices in which one of a plurality of devices functions as a master and the others occupy a shared physical channel connected to the master device.

A BLE slave does not share a common physical channel with a master. Each slave communicates with a master through a separate physical channel. There is another piconet (piconet F) including a master device F and a slave device G.

A device K belongs to a scatternet K. In this case, the scatternet refers to a group of piconets interconnected to each other.

A device K is the master of a device L and also a slave of a device M.

A device O also belongs to a scatternet O. The device O is a slave of a device P and also a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In the group D, the device D performs advertising using an advertisement event which may be connected to an advertising physical channel, and the device A is an initiator. The device A may establish a connection to the device D and add a device to the piconet A.

In the group C, the device C performs advertising through an advertising physical channel using a certain type of an advertisement event captured by the scanner device E.

The group D and the group C may use different advertising physical channels or different time frames so as to avoid a collision.

The piconet F has one physical channel. The device F and the device G use a single BLE piconet physical channel. The device F is a master, and the device G is a slave.

The group H has one physical channel. The devices H, I, and J use one BLE advertising physical channel. The device H is an advertiser, and the devices I and J are scanners.

In the scatternet K, the devices K and L use a single BLE piconet physical channel. The devices K and M use another BLE piconet physical channel.

In the group K, the device K performs advertising using an advertisement event which may be connected to an advertising physical channel, and the device N is an initiator. The device N may establish a connection with the device K. In this case, the device K functions as a slave of two devices and also as a master of one device.

In the scatternet O, the devices O and P use a single BLE piconet physical channel. The devices O and Q use different BLE piconet physical channels.

In the group R, the device R performs advertising using an advertisement event which may be connected to an advertising physical channel, and the device O is an initiator. The device O may establish a connection with the device R. In this case, the device O functions as a slave of two devices and also a master of one device.

FIG. 4 illustrate an example of a Bluetooth communication architecture to which methods proposed in this specification are applicable.

Referring to FIG. 4, FIG. 4(a) illustrates an example of a Bluetooth BR (Basic Rate)/EDR (Enhanced Data Rate) protocol stack and FIG. 4(b) illustrates an example of a Bluetooth LE (Low Energy) protocol stack.

Specifically, as illustrated in FIG. 4(a), the Bluetooth BR/EDR protocol stack may include a controller stack 10 and a host stack 20 above and below a host controller interface (HCI) 18.

The host stack (or host module) 20 refers to hardware for transmitting or receiving Bluetooth packets to or from a wireless transceiver module receiving 2.4 GHz Bluetooth signals and is connected to the Bluetooth module corresponding to the controller stack 10 to control the Bluetooth module and perform operations.

The controller stack 10 may include a PHY layer 12, a link controller layer 14 and a link manager layer 16.

The PHY layer 12 transmits and receives 2.4 GHz radio signals and can hop 79 RF channels and transmit data when GFSK (Gaussian Frequency Shift Keying) modulation is used.

The link controller layer 14 serves to transmit digital signals, selects a channel sequence hopping 1400 times per second and transmits a 625 μs time slot per channel.

The link manager layer 16 controls overall operations (link setup, control and security) of Bluetooth connection using LMP (Link Manager Protocol).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in FIG. 4(b), the Bluetooth LE protocol stack includes a controller stack 30 operable to process a wireless device interface for which timing is important and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the Generic Access Profile (GAP) 40, the logical link control and adaptation protocol (L2CAP) 41, the Security Manager (SM) 42, the Attribute Protocol (ATT) 440, the Generic Attribute Profile (GATT) 44, the Generic Access Profile 25 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for a client device to request specific information from a server device, and the response message, as a response message with respect to the request message, refers to a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

The present invention may transmit a data length value from the GATT profile employing the attribute protocol (ATT) 43 upon a request of long data, allowing the client device to know the exact data length and receive a characteristic value from the service device by using the UUID.

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

A description will be given of procedures of the BLE technology.

The BLE procedures may be classified into a device filtering procedure, an advertising procedure, a scanning procedure, a discovery procedure and a connection procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertising procedure to perform undirected broadcast to devices within a region.

Here, the undirected broadcast is advertising toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 illustrates an example of a structure of a GATT (Generic Attribute Profile) of Bluetooth low energy.

Referring to FIG. 5, the structure for exchange of Profile Data of Bluetooth Low Energy will be described.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method for acquiring combination information on a device to be controlled by a control device through the GATT and information related to controllable operation to control the device.

FIG. 6 shows an example of a method for the connection procedure of the BLE specification.

A server sends an advertisement message through three advertisement channels (S6010).

The server may be called an advertiser before a connection is established and may be called a master after the connection is established. Examples of the server include sensors (e.g., temperature sensors).

Furthermore, the client may be called a scanner before a connection is established and may be called a slave after the connection is established. The client may be a smart phone, for example.

As described above, Bluetooth communication uses a total of 40 channels through a frequency of 2.4 GHz. Three of the 40 channels are advertisement channels, which are used for exchanging packets to establish a connection in addition to various advertising packets.

The remaining 37 channels are data channels which are used for the exchange of data packets after a connection is established.

After receiving the advertisement message, the client may send a scan request to the server in order to obtain additional data (e.g., a server device name) from the server.

The server sends a scan response, together with the remaining data, to the client in response to the scan request.

In this case, the scan request and the scan response are one type of an advertisement packet which may include only user data of 31 bytes or less.

Therefore, if a data size is larger than 31 bytes, but with large overhead from established connection to send data, the data is divided into two blocks and transmitted twice using the scan request/scan response.

Next, the client sends, to the server, a connection request for establishing BLE with the server (S6020).

Accordingly, a link layer (LL) connection is established between the server and the client.

Thereafter, the server and the client perform a security establishment procedure.

The security establishment procedure may be construed as secure simple pairing or may be performed with the secure simple pairing being included therein.

In other words, the security establishment procedure may be performed through a phase 1 to a phase 3.

More specifically, a pairing procedure (i.e., the phase 1) is performed between the server and the client (S6030).

Through the pairing procedure, the client sends a pairing request to the server, and the server sends a pairing response to the client.

In the phase 2, a legacy pairing or secure connection is performed between the server and the client (S6040).

In the SSP phase 3, a key distribution procedure is performed between the server and the client (S6050).

Through the phases, a secure connection is established between the server and the client, and encrypted data may be transmitted and received.

Secure Simple Pairing

Secure simple pairing providing a convenient pairing procedure for the user and is performed for the purpose of reinforcing security against passive eavesdropping and MITM (Man-In-The-Middle) attack.

The secure simple pairing consists of the following four stages.

IO capability exchange
Public key exchange
Authentication stage 1
Authentication stage 2

First, devices exchange IO capabilities to determine an algorithm relevant to secure simple pairing.

To this purpose, an initiator transmits to a responder an IO capability request message requesting IO capability, and the responder transmits an IO capability response message in response to the request.

The initiator and the responder exchange their IO capabilities at the IO capability exchange stage.

After exchanging IO capabilities, two devices exchange public keys.

If the length of a public key is longer than that of payload body of the DM1 packet, the public key may be exchanged by exchanging messages multiple times At the public key exchange stage, two devices may exchange DH (Diffie-Hellman) keys which are symmetric keys of 192 or 256 bit length.

Afterwards, at the authentication stage 1, whether an MITM attach has occurred is checked.

To check the occurrence, secure simple pairing uses three methods of Just Work, Passkey Entry, and Numeric Comparison according to input/output capabilities of devices as shown in Table 2 below.

TABLE 2

| Device Attribute | Display Only | Display & Input | Keyboard Only | No Input No Output |
|---|---|---|---|---|
| Display Only | Numeric Comparison | Numeric Comparison | Passkey Entry: | Just Works |
| Display & Input | Numeric Comparison | Numeric Comparison | Passkey Entry: | Just Works |
| Keyboard Only | Passkey Entry: | Passkey Entry: | Passkey Entry: | Just Works |
| No Input No Output | Just Works | Just Works | Just Works | Just Works |

Numeric Comparison: it is used when both of the two devices are equipped with a display device on which a six digit number may be displayed, and an input device by which "yes" or "no" may be selected is employed.
Just Works: it is used when at least one of the two devices does not have a device on which a six digit number may be displayed, and the other device does not have an input device through which a six digit number may be entered.
Passkey Entry: it is used when one of the two devices does not have a display device on which a six digit number may be displayed but has an input device while the other device is equipped with a display device on which a six digit number may be shown.
Out of Band: it is used when the out-of-mechanism (for example, NFC) capable of searching for a remote device and supporting exchange of cryptographic numbers to be used in a pairing process is used.

After the Authentication stage 1, a cryptographic channel is created by checking the DHKey through the Authentication stage 2 and through a link key generation procedure.

FIGS. 7 and 8 illustrate one example of an authentication method to which methods according to the present invention may be applied.

FIG. 7(a) illustrates one example of legacy pairing, and (b) illustrates one example of numeric comparison.

FIG. 8(a) illustrates one example of Just Work, and (b) illustrates one example of Passkey Entry.

As shown in FIG. 7(a), in the case of legacy pairing, pairing is performed by providing a PIN code output through the output unit (for example, display unit) of a master device to a slave device.

In the case of Numeric Comparison, as shown in FIG. 7(b), device authentication is done by checking whether the numbers displayed on the master and slave devices are the same and confirming the devices when they are the same.

Just Work is a method that may be used for a device that does not have a display device; as shown in FIG. 8(a), a master device is connected to a slave device according to a request from the master device, and the slave device displays to the outside through the output unit that the connection has been successfully established.

In the case of Passkey Entry, as shown in FIG. 8(b), if a specific Passkey is displayed on the master device, and the displayed Passkey is input through the slave device, the master and slave devices are connected to each other.

To transmit and receive data by using Bluetooth communication, a Bluetooth device has to search for another Bluetooth device and establish a connection to the device.

At this time, in the process of forming a connection, two devices are required to authenticate each other and grant rights of use as described above. In the authentication process, the aforementioned methods such as Legacy Pairing, Numeric Comparison, and Passkey Entry may make the user go through an inconvenient, difficult process due to a predefined password or multiple logins.

Also, even if authentication is done in the link layer, additional authentication is required in the profile since authentication and authorization to use a specific service is not granted.

Therefore, to solve the problem above, the present invention proposes a method for authentication in a specific profile, which may be recognized intuitively by a user according to an input/output function of a device.

FIG. 9 is a flow diagram illustrating one example of an authentication procedure for a device according to the present invention.

Referring to FIG. 9, a device generates a code for device authentication by using the information provided by the user and is authenticated by transmitting the generated code to a counterpart device.

More specifically, a first device 300 and a second device 400 discover each other through the discovery procedure described above and stay in a pairing mode for conducting authentication.

The first device 300 and the second device 400 form a link layer connection through transmitting and receiving a connection request message described in FIG. 6, S9010.

The first 300 and the second device 400 may exchange information by using the ATT protocol through the link layer connection established.

The first 300 and the second device 400 may obtain capability information of counterpart devices through the link layer connection established before conducting an authentication procedure (pairing exchange feature procedure).

In other words, the first 300 and the second device 400 may obtain input/output capability information supported by their counterpart device.

More specifically, the first device 300 transmits to the second device 400 a request message requesting I/O capability information of the second device 400.

At this time, the first device 300 may transmit its I/O capability information (first I/O capability information) by including the I/O capability information in the request message.

The second device 400 receiving a request message requesting I/O capability information from the first device 300 transmits a response message including its I/O capability information (second I/O capability information).

Through the operation above, the first 300 and the second device 400 can know which input/output function may be performed in their counterpart device.

Afterwards, the first device 300 obtains authentication information from the user according to the input/output function that may be supported by the first device 300.

For example, in case the first device 300 is a device capable of fingerprint recognition, the first device 300 recognizes the user's fingerprint and converts the fingerprint, which is the recognized biometric information, into data (for example, fingerprint information).

The first device generates a random code for authentication through a specific algorithm based on the converted data.

Table 3 below shows one example of an information type that may be obtained from user interactions.

TABLE 3

| Information Type |
|---|
| PIN |
| Password |
| Face |
| Voice |
| Iris |
| ECG |
| Pattern |
| Gesture |
| Fingerprint |
| Palm Vein |

TABLE 3-continued

| Information Type |
| --- |
| Bio-impedance |
| Knock Pattern |
| Etc. |

The first device 300, which has generated a random code through information input from the user, performs a random code exchange procedure to transmit the generated random code to the second device 400.

More specifically, the first device 300 transmits a write request message including the generated random code to the second device 400 and requests the second device 400 to write the random code S9040.

At this time, the first device 300 generates and transmits a random code by taking into account the input/output function of the second device 400.

For example, if the output unit of the second device 400 is an LED, the first device 300 generates a random code corresponding to the information that may be displayed through the LED by using the information obtained from the user and transmits the generated random code to the second device 400.

After checking the random code transmitted through a write request message, the second device 400 transmits a write response message to the first device 300.

The second device 300 outputs information corresponding (or mapped to) the random code obtained from the first device 300, S9060.

For example, in case the second device 400 is equipped with an LED and only one button, and the information corresponding to the random code transmitted from the first device 300 indicates one blink of the LED, the second device 400 blinks the LED once.

Afterwards, the second device 400 obtains data for device authentication from the user and determines whether the obtained data corresponds (or is mapped) to output information S9070.

For example, in case the second device 400 blinks the LED once and the corresponding data is to press the button once, the second device 400 determines whether the data obtained from the user corresponds to pressing the button once.

If the data input from the user is not mapped to the information output from the second device, authentication fails.

However, if the data input from the user is mapped to the information output from the second device, authentication succeeds.

Afterwards, the first 300 and the second device 400 performs an authentication success check procedure to check whether authentication has been performed successfully.

More specifically, the second device 400 transmits to the first device 300 an indication message including state information indicating whether authentication has been performed successfully S9080.

In case authentication fails, the state information indicates authentication failure; in the opposite case, the state information indicates success of authentication.

The first device 300 may recognize whether the first device 300 has been authenticated through the indication message transmitted from the second device 400 and transmits a confirmation message to the second device 400 in response to the indication message S9090.

In this manner, a device may be authenticated through a specific service (User Authentication Service) and may be authenticated through a method that may be recognized intuitively by the user taking into account the input/output function of the device.

FIG. 10 is a flow diagram illustrating another example of an authentication procedure for a device according to the present invention.

Referring to FIG. 10, the user may generate a code for device authentication by using a predetermined method and transmit the generated code to the other device to have the device authenticated.

More specifically, the first device 300 and the second device 400 discover each other through the discovery procedure described above and stay in a pairing mode for performing authentication.

Afterwards, the S10010 and the S10020 steps are the same as the S9010 and the S9020 steps, descriptions thereof will be omitted.

After the S10020 step, once the authentication procedure is started, the first device 300 generates a random code for authentication by using a specific algorithm through a predetermined method (for example, a password or pattern that the user has input in advance) S10030.

At this time, the predetermined method may include the method of Table 3.

Afterwards, the steps of S10040 to S10090 are the same as the steps of S9040 to S9090, descriptions thereof will be omitted.

By using the method above, even if there is no specific input from the user, the authentication procedure may be performed by generating a random code through a predetermined method.

FIG. 11 is a flow diagram illustrating one example of a method for generating a code for authenticating a device according to the present invention.

Referring to FIG. 11, a device may perform an authentication procedure by generating an authentication code through the information input from the user.

More specifically, as described in FIGS. 9 and 10, a device may obtain authentication information from the user S11010. At this time, the authentication information may be input through the method described in Table 3.

The device converts the input authentication information to the data for generating a random code S11020.

The device may store the converted data for the case in which the same user inputs the same authentication information.

Afterwards, the device may generate a random code by using a specific algorithm based on the converted data S11030.

For example, as shown in Eq. 1 below, a random code may be generated through AES (Advanced Encryption Standard)-CMAC (Cipher-based Message Authentication Code) algorithm.

$$\text{Random Code} = \text{AES-CMAC}(\text{Public Key}, \text{Data}) \quad [\text{Eq. 1}]$$

In Eq. 1, Public Key may correspond to the key exchanged between devices through the secure simple pairing described with reference to FIG. 6, and Data is the data converted from authentication information.

At this time, a device may generate a random code by taking into account the input/output capability of the other device.

For example, in case the other device is equipped with only on LED as an input/output method, the device generates a random code that may be output through the LED.

Table 4 below illustrates one example of a mapping relationship between a random code and the corresponding output information.

TABLE 4

| | Random Code | | | |
|---|---|---|---|---|
| | 0x00000001 | 0x00000002 | 0x00000003 | 0x00000004 |
| LED | 1 × Red Light On | 1 × Blue Light On | 1 × Green Light On | 2 × Red Light On |
| Vibration | 1 × Short Vibration | 2 × Short Vibration | 1 × Long Vibration | 2 × Long Vibration |
| Password | 23sfadf492 | 3dfj39fd0d | 32854dfsd3 | 38sdfk4892 |
| Etc. | ... | ... | ... | ... |

By using the method above, a device may generate an authorization code through authentication information input from the user.

FIG. 12 illustrates one example of a method for authenticating a device by generating authentication information through user information according to the present invention.

Referring to FIG. 12, a device that has previously obtained authentication information from the user may generate a random code and perform device authentication by using the data corresponding to the previously obtained authentication information.

More specifically, ① in case device 1 and device 2 attempt to form a connection to each other, the two devices receive authentication information from the user.

At this time, input authentication information is the same as the authentication information obtained previously, namely in case the user entering authentication information is the same person who has once input authentication information before, device 1 determines whether the data converted from previously input authentication information is stored.

If stored data is found, device 1 generates a random code through the method described with reference to FIG. 11 by using the stored data.

② Afterwards, device 1 transmits the generated random code to the device 2 and establishes a connection by performing the authentication procedure through the method described with reference to FIG. 9 or 10.

FIG. 13 illustrates another example of a method for authenticating a device by generating authentication information through user information according to the present invention.

Referring to FIG. 13, a device which has obtained authentication information from the user for the first time or which has obtained authentication information from an existing user through a different method may perform device authentication by generating a random code through the obtained authentication information.

More specifically, ① in case device 1 and device 2 attempt to form a connection to each other, the two devices receive authentication information from the user.

② At this time, in case the input authentication information is not the same as the previously input authentication information, in other words, in case the user who has entered authentication information uses the device 1 for the first time or an existing user enters authentication information by using a different method from the one through which the existing user has entered authentication information (for example, the user enters authentication information by using fingerprint recognition in one case and enters a pattern for another case), the device 1 converts the input authentication information to data and stores the converted data.

Also, the device 1 generates a random code through the method described with reference to FIG. 11 by using the converted data.

③ Afterwards, the device 1 transmits the generated random code to the second device and forms a connection by performing an authentication procedure through the method described with reference to FIG. 9 or 10.

FIG. 14 illustrates a yet another example of a method for authenticating a device by generating authentication information through user information according to the present invention.

Referring to FIG. 14, a device may be authenticated if the user enters an input corresponding to a random code generated through the information input from the user to the other device.

More specifically, ① in case device 1 attempts to form a connection to device 2 or device 3, device 1 obtains authentication information from the user.

Or the device 1 may receive authentication information from the user in advance.

At this time, the device 1 may receive authentication information from the user according to the input/output method supported by the device 1, where input methods may be as shown in Table 3.

The device 1 converts the input authentication information into data and stores the converted authentication information, and if the input authentication information is the same as the previously input authentication information, the device 1 determines whether the converted data is stored from the previously input authentication information.

In case the data converted from the previously input authentication information is stored, the stored data is retrieved. If the data is not stored, the input authentication information is converted into data and stored.

② The device 1 searches for device 2 and/or device 3 through the method described with reference to FIG. 6 and outputs searched devices through the output unit.

The user may select a device to connect from among output devices.

The device 1 selects a device that the user wants to connect to and if the user inputs a selected device, the device 1 generates a random code through the method described with reference to FIG. 11 by using the data converted from authentication information or stored data.

At this time, a random code may be generated according to an input/output function of a selected device.

Device 1 generates a random code and transmits the generated random code to device 2 or device 3.

③ The device 2 or device 3 outputs information corresponding (or mapped) to the random code transmitted by the device 1.

For example, in case the information corresponding to the random code transmitted from the device 1 is a password, the device 2 may display the password.

Similarly, in case the information corresponding to the random code transmitted from the device 1 is a pattern, the device 3 may output the corresponding pattern.

Afterwards, the device 2 or device 3 receives data from the user, and if the input data is mapped (or corresponds) to the output information, authentication succeeds, and a connection to the device 1 is established.

For example, in case the device 2 outputs a password, and the corresponding password is entered; or in case the device 3 outputs a pattern, and the pattern the same as the output pattern is entered, the device 2 or device 3 forms a connection to the device 1.

Through the method above, devices may perform device authentication by using the User Authentication Service and may perform an authentication procedure through a method that may be recognized intuitively by the user.

According to a method and an apparatus for authenticating a device by using the Bluetooth technology according to one embodiment of the present invention, an authentication procedure for device connection may be performed.

Also, according to the present invention, a device may be authenticated for Bluetooth connection by using the user information.

Also, according to the present invention, user convenience may be improved by authenticating a device through the operation corresponding to the information input from the user.

Also, according to the present invention, an authentication procedure may be recognized intuitively by authenticating a device through a different method according to the input/output function of the device.

The advantageous effects that may be obtained from the present invention are not limited to those described above, and other effects not mentioned above may be understood clearly by those skilled in the art to which the present invention belongs from the following descriptions.

Although the present invention has been described on the basis of the Bluetooth LE technology, but the present invention may also be applied to the Bluetooth BR/EDR.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

The method for authenticating a device using Bluetooth technology according to the present invention is not limited to the embodiments described above, but the entire or part of the embodiments may be combined selectively so that various modifications may be made to the embodiments.

Meanwhile, the method for authenticating a device using Bluetooth technology according to the present invention may be implemented in the form of processor-readable program codes in a recording medium that may be read by a processor installed in a network device. The processor-readable recording medium includes all kinds of recording devices storing data that may be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium may be distributed over computer systems connected to each other through a network so that processor-readable codes may be stored and executed in a distributed manner.

Throughout the document, preferred embodiments of the present invention have been described with reference to appended drawings; however, the present invention is not limited to the embodiments above. Rather, it should be noted that various modifications of the present invention may be made by those skilled in the art to which the present invention belongs without leaving the technical scope of the present invention defined by the appended claims, and these modifications should not be understood individually from the technical principles or aspects of the present invention.

The present document describes both of the product invention and the process invention, and depending on the needs, descriptions of the respective inventions may be applied in a supplementary manner.

What is claimed is:

1. A method for a first device to perform authentication by using Bluetooth LE (Low Energy), the method comprising:
   transmitting a request message requesting capability information of a second device,
   wherein the request message includes first input/output capability information of the first device;
   receiving a response message including second input/output capability information of the second device in response to the request message;
   generating a random code for first authentication through a user authentication service based on at least one of the first and second input/output capability information;
   transmitting a write request message including the generated random code to the second device;
   receiving a write response message in response to the write request message from the second device;
   receiving an authentication indication message from the second device,
   wherein the authentication indication message includes state information indicating success or failure of the first authentication based on the random code; and
   transmitting an authentication complete message in response to the authentication indication message.

2. The method of claim 1, further comprising
   determining a specific method for establishing a secure connection based on the second input/output capability information; and
   performing an authentication procedure for second authentication by using the specific method.

3. The method of claim 2, wherein the specific method is one of OOB (Out-Of-Band), Passkey Entry, Numeric Comparison, or Just Works.

4. The method of claim 1, further comprising:
   obtaining authentication information for the first authentication from thea user.

5. The method of claim 4, wherein the authentication information is one of a password, pattern, or biometric information of the user.

6. The method of claim 4, further comprising:
   transmitting a first public key to the second device; and
   receiving a second public key from the second device.

7. The method of claim 6, wherein the random code is generated by a specific algorithm based on the authentication information and the second public key.

8. The method of claim 7, wherein the specific algorithm is an AES (Advanced Encryption Standard)-CMAC (Cipher-based Message Authentication Code) algorithm.

9. A method for a first device to perform authentication by using Bluetooth LE (Low Energy), the method comprising:
   receiving, from a second device, a request message requesting capability information of the first device,
   wherein the request message includes second input/output capability information of the second device;
   transmitting a response message including first input/output capability information of the first device in response to the request message;
   receiving from the second device a write request message including a random code for first authentication through a user authentication service, wherein the random code is generated based on at least one of the first and second input/output capability information;

transmitting a write response message in response to the write request message to the first device;

performing a specific operation corresponding to the random code;

transmitting an authentication indication message including state information to the second device, wherein the state information indicates success or failure of the first authentication according to whether specific data obtained from a user is mapped to the specific operation; and receiving an authentication complete message in response to the authentication indication message.

10. The method of claim 9, wherein the state information indicates success of the first authentication when the specific data is mapped to the specific operation, and wherein the state information indicates failure of a second authentication when the specific data is not mapped to the specific operation.

11. A first device for performing authentication by using Bluetooth LE (Low Energy), the first device comprising:

transceiver configured to transmit and receive signals; and a processor functionally connected to the transceiver, wherein the processor is configured to:

transmit, to a second device, a request message requesting capability information of the second device, wherein the request message includes first input/output capability information of the first device;

receive, from the second device, a response message including second input/output capability information of the second device in response to the request message;

generate a random code for first authentication through a user authentication service based on at least one of the first and second input/output capability information;

transmit a write request message including the generated random code to the second device;

receive a write response message in response to the write request message from the second device;

receive an authentication indication message from the second device, wherein the authentication indication message includes state information indicating success or failure of the first authentication based on the random code; and transmit an authentication completion message in response to the authentication indication message.

12. The first device of claim 11, wherein the processor is further configured to:

determine a specific method for establishing a secure connection based on the second input/output capability information; and perform an authentication procedure for second authentication by using the specific method.

13. The first device of claim 12, wherein the specific method is one of OOB (Out-Of-Band), Passkey Entry, Numeric Comparison, or Just Works.

14. The first device of claim 11, wherein the processor is further configured to obtain authentication information for the first authentication from a user.

15. The first device of claim 14, wherein the authentication information is one of a password, pattern, or biometric information of the user.

16. The first device of claim 14, wherein the processor is further configured to:

transmit a first public key to the second device; and receive a second public key from the second device.

17. The first device of claim 16, wherein the random code is generated by a specific algorithm based on the authentication information and the second public key.

18. The first device of claim 17, wherein the specific algorithm is an AES (Advanced Encryption Standard)-CMAC (Cipher-based Message Authentication Code) algorithm.

* * * * *